(12) United States Patent
    Alobaidi

(10) Patent No.: US 11,853,833 B2
(45) Date of Patent: Dec. 26, 2023

(54) TRACKING AND ANALYSIS DEVICES AND SYSTEMS FOR TRACKING WORKFLOW ASSETS

(71) Applicant: Green Cubes Technology, LLC, Kokomo, IN (US)

(72) Inventor: Mohammed Alobaidi, Kokomo, IN (US)

(73) Assignee: Green Cubes Technology, LLC, Kokomo, IN (US)

( * ) Notice: Subject to any disclaimer, the term of this patent is extended or adjusted under 35 U.S.C. 154(b) by 97 days.

(21) Appl. No.: 16/892,618

(22) Filed: Jun. 4, 2020

(65) Prior Publication Data

US 2020/0387680 A1     Dec. 10, 2020

Related U.S. Application Data

(60) Provisional application No. 62/857,258, filed on Jun. 4, 2019.

(51) Int. Cl.
    *G06K 7/10*      (2006.01)
    *H04W 4/38*      (2018.01)
    *G06Q 10/0633*   (2023.01)
    *H04W 4/029*     (2018.01)
    *G06K 19/077*    (2006.01)

(52) U.S. Cl.
    CPC ..... *G06K 7/10099* (2013.01); *G06K 7/10475* (2013.01); *G06K 19/07713* (2013.01); *G06Q 10/0633* (2013.01); *H04W 4/029* (2018.02); *H04W 4/38* (2018.02)

(58) Field of Classification Search
    CPC ......... G06K 7/10099; G06K 7/10475; G06K 19/07713; G06Q 10/0633; H04W 4/029; H04W 4/38; H04W 4/023
    See application file for complete search history.

(56) References Cited

U.S. PATENT DOCUMENTS

| | | | |
|---|---|---|---|
| 2016/0129592 A1* | 5/2016 | Saboo ................. | G05D 1/0297 700/248 |
| 2017/0178064 A1* | 6/2017 | Olejak ............... | G08B 21/0227 |
| 2017/0318422 A1* | 11/2017 | Kokkonen ............. | H04W 4/80 |
| 2018/0128694 A1* | 5/2018 | Wee ...................... | G01K 15/00 |
| 2019/0354735 A1* | 11/2019 | Madhusudhana .... | G06V 10/255 |

* cited by examiner

*Primary Examiner* — James J Yang
(74) *Attorney, Agent, or Firm* — Reichel Stohry Dean LLP; Mark C. Reichel; Natalie J. Dean

(57) ABSTRACT

Disclosed herein are tracking and analysis devices, systems, and methods for optimizing workflow operations using the tracking and analysis devices and a plurality of movable and fixed tracking beacons. The movable tracking beacons may be configured for secure attachment to, or incorporation within, mobile workflow assets, while the fixed tracking beacons may be placed around the workflow environment in a grid-pattern. The tracking and analysis devices, as well as the movable and fixed tracking beacons, may each comprise any combination of a: battery, a low frequency Bluetooth module, an accelerometer, a Wi-Fi module, a USB hub, and/or an RFID reader/scanner. The tracking and analysis device may track and identify a workflow asset's location within a workflow environment within a range of about 2-3 feet by receiving and comparing relative signal strength of low frequency Bluetooth signals received from the movable tracking beacons and/or the plurality of fixed tracking beacons.

20 Claims, 3 Drawing Sheets

Fixed Tracking Beacon

Movable Tracking Beacon

TRACKING AND ANALYSIS DEVICES AND SYSTEMS FOR TRACKING WORKFLOW ASSETS

PRIORITY

The present application is related to, and claims the priority benefit of, U.S. Provisional patent Application Ser. No. 62/857,258, filed Jun. 4, 2019, the contents of which are incorporated herein directly and by reference in their entirety.

BACKGROUND

Efficient workflow is the key to productivity in industries that rely on labor. Whether it's a warehouse, fulfillment center, big box store, restaurant, hospital, or events center, the ability to maximize workflow and minimize downtime is key to gains in the bottom line by improving productivity, accuracy, and efficiency.

The first step to creating efficient workflow is through not only understanding the current processes, but also recognizing and pinpointing weak areas needing improvement. Thus, it would be ideal to have a device that can simply attach to items commonly used within workflow operation, such as carts, to collect and analyze workflow asset data, then forward that data to management for analysis and for creating workflow improvements.

Most current tracking and analyzing systems require large bulky tracking hardware be installed in the environment (throughout the store, warehouse, hospital, etc.), and then tagging individual items you wish to track. This is not ideal as it requires a large investment to install and power these fixtures.

Instead, it would be ideal to have a package or device (which contains all tracking materials needed) housed within, or removably attached to, a workflow asset (such as a powered mobile cart) to track or pinpoint that workflow asset within a workflow environment. It would further be desirable to track multiple workflow assets within a workflow environment, to track which direction the workflow assets are moving, track the speed at which the workflow assets are moving, and then utilize that data to further optimize workflow operations.

BRIEF SUMMARY OF THE INVENTION

The present disclosure includes disclosure of a system for optimizing workflow operations by tracking a workflow asset, comprising: at least one movable tracking beacon for secure attachment to a mobile workflow asset, comprising: a low frequency Bluetooth module configured to communicate with other low frequency Bluetooth devices within range; an accelerometer for measuring movement and acceleration of the workflow asset; and a battery for charging the low frequency Bluetooth module, accelerometer, and any other electronic components of the at least one movable tracking beacon; and a plurality of fixed tracking beacons configured for placement around a workflow environment, each of the plurality of fixed tracking beacons having at least a beacon battery and a beacon low frequency Bluetooth module therein, and configured to repeatedly send out low frequency Bluetooth signals; and a tracking and analysis device in low frequency Bluetooth communication with the at least one movable tracking beacon and the plurality of fixed tracking beacons to determine a location of the at least one movable tracking beacon and the mobile workflow asset present within the workflow environment by analyzing signal strength(s) of the low frequency Bluetooth signals received from the plurality of fixed tracking beacons.

The present disclosure includes disclosure of the system, wherein the tracking and analysis device further comprises a Wi-Fi module configured to communicate with other Wi-Fi enabled devices.

The present disclosure includes disclosure of the system, wherein the tracking and analysis device further comprises a RFID reader/scanner configured to detect and read RFID tags.

The present disclosure includes disclosure of the system, wherein the tracking and analysis device is a plurality of tracking analysis devices, and wherein the system is configured to track and monitor the plurality of tracking and analysis devices within the workflow environment simultaneously.

The present disclosure includes disclosure of the system, wherein the tracking and analysis device is further configured to transmit data to a central control administrator or processor for additional analysis and to provide real-time workflow optimization data.

The present disclosure includes disclosure of the system, wherein the tracking and analysis device is rechargeable.

The present disclosure includes disclosure of the system, wherein the at least one movable tracking device is replaceable.

The present disclosure includes disclosure of the system, wherein the plurality of fixed tracking beacons are placed around the workflow environment in a grid configuration at intervals of no more than approximately 20 feet apart, to ensure full low frequency Bluetooth signal coverage of the workflow environment.

The present disclosure includes disclosure of the system, further comprising a 5-volt USB hub for charging the tracking and analysis device.

The present disclosure includes disclosure of the system, wherein the tracking and analysis device further increases workflow efficiency by using the low frequency Bluetooth module of the at least one movable tracking beacon to track the number of customers or employees with a cell phone near the tracking and analysis device, as well as how long those customers or employees remain near the tracking and analysis device.

The present disclosure includes disclosure of the system, further comprising software for use in analyzing data received from the tracking and analysis device.

The present disclosure includes disclosure of the system, wherein the at least one movable tracking beacon is combined with, or incorporated into, the tracking and analysis device.

The present disclosure includes disclosure of the system, wherein the tracking and analysis device determines location of the at least one movable tracking beacon within a range of 2-3 feet.

The present disclosure includes disclosure of a method for tracking a workflow asset, comprising: providing a moveable tracking beacon, comprising: a low frequency Bluetooth module configured to communicate with other low frequency Bluetooth devices within range; an accelerometer for measuring the movement and acceleration of a workflow asset; and a battery for charging the low frequency Bluetooth module, accelerometer, and any other electronic components in the movable tracking beacon; and attaching the movable tracking beacon to the workflow asset to be tracked; positioning a plurality of fixed tracking beacons around a workflow environment; activating the plurality of fixed tracking beacons to emit low frequency Bluetooth signals therefrom; receiving the plurality of low frequency Bluetooth signals at a tracking and analysis device; wherein relative signal strength of low frequency Bluetooth signals received from each of the plurality of fixed tracking beacons indicates distance relative to the moveable tracking beacon and the workflow asset attached thereto.

The present disclosure includes disclosure of the method, wherein the distance of the plurality of fixed tracking beacons relative to the tracking and analysis device is pinpointed to within a range of at least 2-3 feet.

The present disclosure includes disclosure of the method, wherein the plurality of fixed tracking beacons are placed around the workflow environment in a grid pattern at intervals of no more than approximately 20 feet.

The present disclosure includes disclosure of the method, wherein the plurality of low frequency Bluetooth signals received by the tracking and analysis device further indicate a direction and speed at which the tracking and analysis device is moving.

The present disclosure includes disclosure of a tracking and analysis device for tracking a mobile workflow asset within a workflow environment, comprising: a movable tracking beacon attached to a workflow asset, comprising; a low frequency Bluetooth module configured to communicate with other low frequency Bluetooth devices within range; an accelerometer for measuring the movement and acceleration of the workflow asset; and a battery for charging the low frequency Bluetooth module, accelerometer, and movable tracking beacon within the tracking and analysis device; and wherein the movable tracking beacon within the tracking and analysis device calculates location of itself, and the workflow asset attached thereto, within a workflow environment by analyzing relative signal strength of low frequency Bluetooth signals received from a plurality of fixed tracking beacons around the workflow environment.

The present disclosure includes disclosure of a tracking and analysis device, wherein the tracking and analysis device further determines location of itself, and the workflow asset attached thereto, within a range of 2-3 feet.

The present disclosure includes disclosure of a tracking and analysis device, wherein the tracking and analysis device further indicates a direction and speed at which the workflow asset is moving.

BRIEF DESCRIPTION OF THE DRAWINGS

The disclosed embodiments and other features, advantages, and disclosures contained herein, and the matter of attaining them, will become apparent and the present disclosure will be better understood by reference to the following description of various exemplary embodiments of the present disclosure taken in conjunction with the accompanying drawings, wherein.

Figure 1:
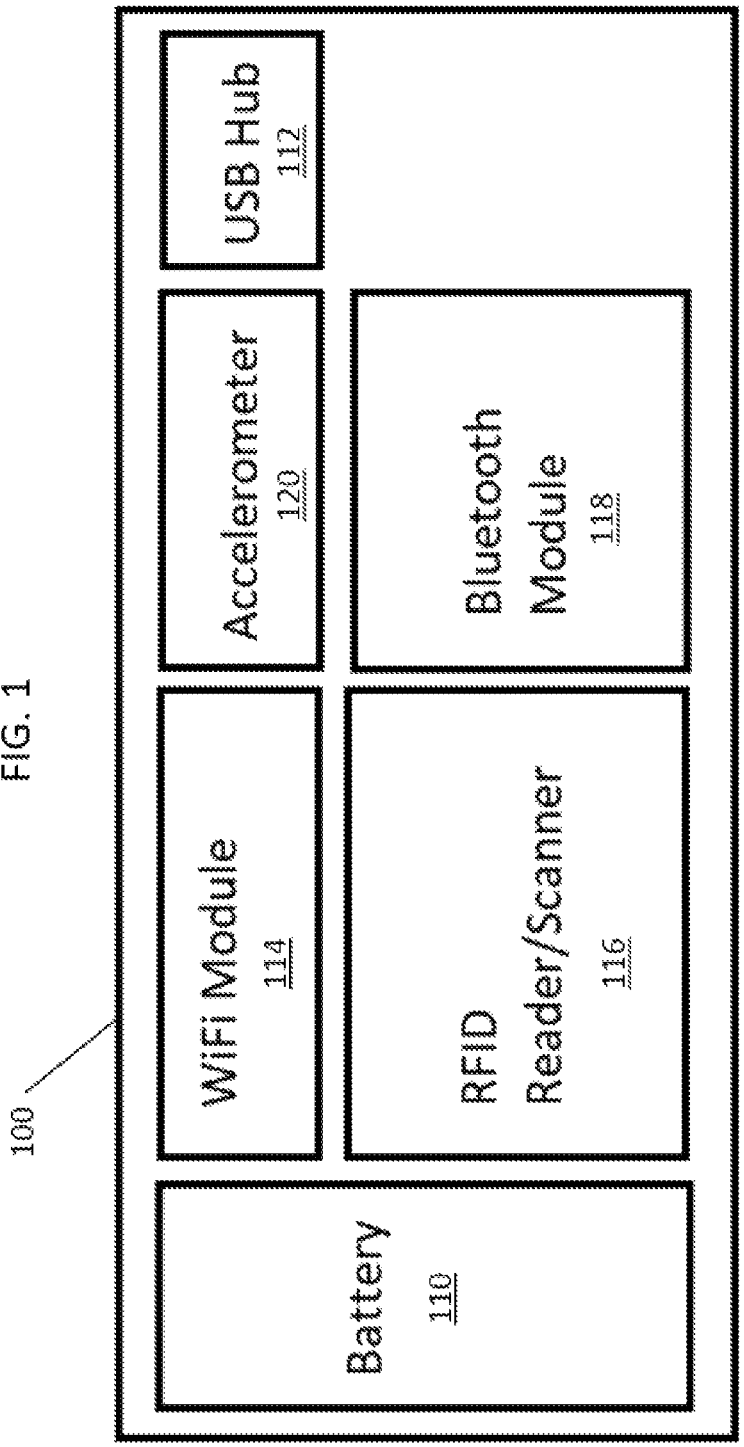
FIG. 1 illustrates an exemplary schematic representation of the electrical componentry within the tracking and analysis package.

As such, an overview of the features, functions and/or configurations of the components depicted in the various figures will now be presented. It should be appreciated that not all of the features of the components of the figures are necessarily described and some of these non-discussed features (as well as discussed features) are inherent from the figures themselves. Other non-discussed features may be inherent in component geometry and/or configuration. Furthermore, wherever feasible and convenient, like reference numerals are used in the figures and the description to refer to the same or like parts or steps. The figures are in a simplified form and not to precise scale.

DETAILED DESCRIPTION

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

The present disclosure includes various tracking and analysis devices, beacons, systems for tracking and analysis, and methods for operating the beacons, systems, and tracking and analysis devices herein. These tracking and analysis devices may generally include any combination of at least the following features/accessories: a battery or USB hub for charging, a low frequency Bluetooth module, an RFID reader/scanner (working in cooperation with RFID tags), a Wi-Fi module, and an accelerometer. These tracking and analysis devices work in cooperation with both fixed and movable tracking beacons and can communicate using low frequency Bluetooth and/or Wi-Fi. The fixed and moveable tracking beacons may contain only a small circuit board, battery, and signal generator (Wi-Fi module and/or low frequency Bluetooth), or may be much more sophisticated and also contain an accelerometer, RFID reader/scanner, and USB hub. The tracking and analysis devices and tracking beacons are not limited to the embodiments shown herein, as they may vary in look, size, shape, electrical componentry, and accessories based upon each customer's requirements.

As shown in FIG. 1, an exemplary tracking and analysis device(s) 100 may be a small package that can be integrated into a workflow asset (such as a mobile powered cart) at manufacturing, or it may be attached or added later to an existing asset (such as a cart). Additionally, small non-intrusive and subtle looking tracking beacons (both fixed and movable) would also be used in combination with proprietary software to maximize accuracy and efficiency of the tracking and analysis device 100 to determine location of the workflow asset and optimize workflow.

Figure 2:
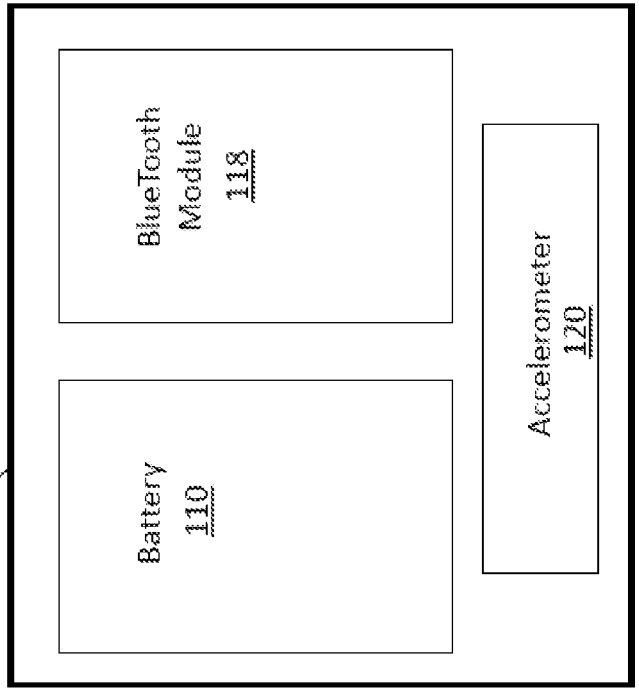
FIG. 2 illustrates an exemplary schematic representation of the electrical componentry within a moveable tracking beacon.
Figure 3:
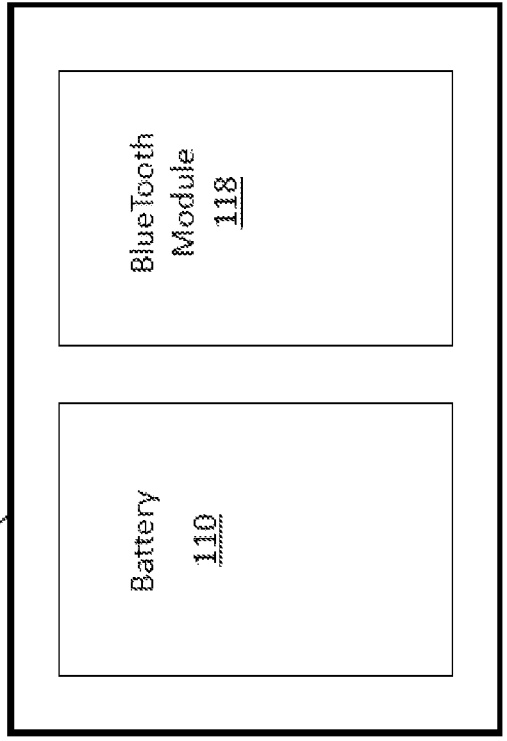
FIG. 3 illustrates an exemplary schematic representation of the electrical componentry within a fixed tracking beacon.

There are two types of tracking beacons which may be used in conjunction with the tracking and analysis device 100 herein: 1) fixed tracking beacons 102; and 2) moveable tracking beacons 104. The fixed tracking beacons 102, as shown in FIG. 2, may be small (non-moveable) beacons placed at various locations around the workflow environment, such as on the walls, ceilings, floors, etc. The moveable tracking beacons 104, as shown in FIG. 3, may be small moveable beacons placed on mobile workflow assets that need to be tracked within the workflow environment. In operation, a plurality of both fixed 102 and moveable 104 tracking beacons would be used in combination with the tracking and analysis device 100 to maximize accuracy of data obtained. It should be understood that the tracking and analysis devices 100 and fixed 102 and moveable 104 tracking beacons herein may be used on any size, shape, or type of workflow asset, in any configuration, in any industry.

As shown in FIG. 1, a tracking and analysis device 100 may include a battery 110 or USB hub 122 for charging, a Wi-Fi module 114 for receiving and transmitting data, an RFID reader/scanner 116 for reading RFID tags, a low frequency Bluetooth module 118, and an accelerometer 120. In some embodiments, the tracking and analysis device 100 itself may also include a tracking beacon 102, 104 therein. Within the tracking and analysis device 100, the battery 110 and/or USB hub 122 may be electrically coupled to many or all of the other electrical components (114, 116, 118, 120) to provide power. The battery 110 may comprise a recharging and/or replaceable lithium battery 110, for example. The tracking and analysis device 100 may include a small battery access door for replacing the battery 110 as needed. If the battery 110 is a lithium power pack (approximately 4 AA batteries) then lifetime could be approximately 2 years. The runtime may vary based on the electrical componentry within the tracking and analysis device 100. For example, a more simplified version of the tracking and analysis device 100 (containing only a few of the electrical components shown in FIG. 1) would require less battery power and thus the battery life would be longer.

In an alternative embodiment, if the USB hub 122 (such as 5 volts, for example) is used for charging, then the USB hub would continue to provide power to the tracking and analysis device 100 and thus, the device 100 would not require a battery and/or recharging. The RFID reader/scanner 116 may be used to read RFID tags, such as on retail items or medical equipment, for example. The data received/detected by the tracking and analysis device 100 may be then sent to a central control administrator or processor, via either Wi-Fi module 114 and/or low frequency Bluetooth module 118. Low frequency Bluetooth module 118 further receives the Bluetooth signals sent by the fixed 102 and movable 104 tracking beacons. The accelerometer 120 measures the movement and/or acceleration of the tracking and analysis device 100, to determine in what direction, and at what speed, the device 100 may be moving.

With reference now to FIGS. 2 and 3, both the fixed tracking beacon 102, and the movable tracking beacon 104, may be customized to include different pieces of electrical componentry therein, depending upon a customer's requirements. For example, in some embodiments, both the fixed 102 and the movable 104 tracking beacons may contain very minimal electrical componentry, such as only a battery 110 and low frequency Bluetooth module 118 to emit signals therefrom, as shown in FIG. 2. In this embodiment, containing minimal electrical componentry, the fixed tracking beacon 102 would be much smaller (i.e., less noticeable/invasive in the environment), such as the size of a coin battery, and use less battery power, thus providing a longer battery lifetime/runtime.

In alternative embodiments, the customer may desire additional electrical componentry to be added thus, making both the fixed 102 and movable 104 tracking beacons entirely customizable. For example, the customer may choose to add one, a few, or all of the following pieces of electrical componentry: a battery 110, a Wi-Fi module 114, an RFID scanner 116, a low frequency Bluetooth module 118, accelerometer 120, and/or USB hub 120. In this embodiment, the fixed tracking beacon 102 may then contain the same componentry as the tracking and analysis device 100 (shown in FIG. 1), and may operate as both a fixed tracking beacon 102 as well as a tracking and analysis device 100. In this embodiment, the combined fixed tracking beacon 102 and tracking and analysis device 100 may be larger (i.e., more noticeable/invasive in the environment) and require more battery power, thus having a shorter battery lifetime/runtime. In yet another alternative embodiment, as shown in FIG. 3, a moveable tracking beacon 104 may contain only a battery 110, a low frequency Bluetooth module 118, and an accelerometer 120, for example.

As shown in FIG. 2, in one embodiment, a small fixed tracking beacon 102 may include a battery 110 for charging and a low frequency Bluetooth module 118 for sending out low frequency Bluetooth signals. As described above, the fixed tracking beacon 102 may also be entirely customizable to include fewer pieces of electrical componentry, or additional pieces of electrical componentry, depending upon customer requirements. The battery 110 may be a replaceable or rechargeable lithium battery, for example. These fixed tracking beacons 102 may be spaced out around the workflow operations, such as placed at approximately every 20 feet. In operation, the fixed tracking beacons 102 may be placed around the entire perimeter of the workflow operations at 20-foot intervals, as well as internally at approximately 20 feet intervals in a grid configuration, to ensure that a tracking and analysis device 100 could detect a low frequency Bluetooth signal sent from any of the fixed tracking beacons, regardless of location within the workflow. The fixed tracking beacons 102 should be placed close enough together to ensure full signal coverage (i.e., low frequency Bluetooth signal) of the workflow operations area and prevent any gaps that are not able to receive a signal (i.e., a low frequency Bluetooth signal). This allows the tracking and analysis device 100 to locate itself within the workflow operations.

The moveable tracking beacons 104, as shown in FIG. 3, may be small beacons that can be attached to workflow assets to be tracked. This allows the tracking and analysis device 100 to locate itself with regard to the assets (on the moveable tracking beacons 104) within the workflow operations. As shown in FIG. 3, a moveable tracking beacon 104 may include a battery 110 for charging, a low frequency Bluetooth module 118 for sending out low frequency Bluetooth signals, and an accelerometer 120 to determine if the asset is moving. As described above, the moveable tracking beacon 104 may also be entirely customizable to include fewer pieces of electrical componentry, or additional pieces of electrical componentry, depending upon customer requirements. The battery 110 may be a replaceable or rechargeable lithium battery, for example. In a hospital workflow operation, small moveable tracking beacons 104 may be placed on smaller assets such as IV pumps. In retail workflow operations, small moveable tracking beacons 104 may be placed on smaller assets such as barcode readers/scanners, etc.

The tracking and analysis device(s) 100 herein may be configured as a package which may be sold as a standalone tracking system that could be installed in (or attached to) any workflow asset, or it could be sold as an integrated package already installed within a unit. In one example, a tracking and analysis device 100 may be implemented in the healthcare industry by attaching the fixed tracking beacons 102 throughout the hospital environment (i.e., walls, floors, ceiling, etc.) while the tracking and analysis device 100 would be installed on mobile medical carts, mobile IV units, and other assets that the hospital would like to track. The mobile medical carts (having the tracking and analysis device 100 thereon) would then receive pings (i.e., low frequency Bluetooth signals) from the surrounding fixed tracking beacons 104 in the hospital environment, thus allowing the cart to recognize where it is located within the hospital.

Figure 4:
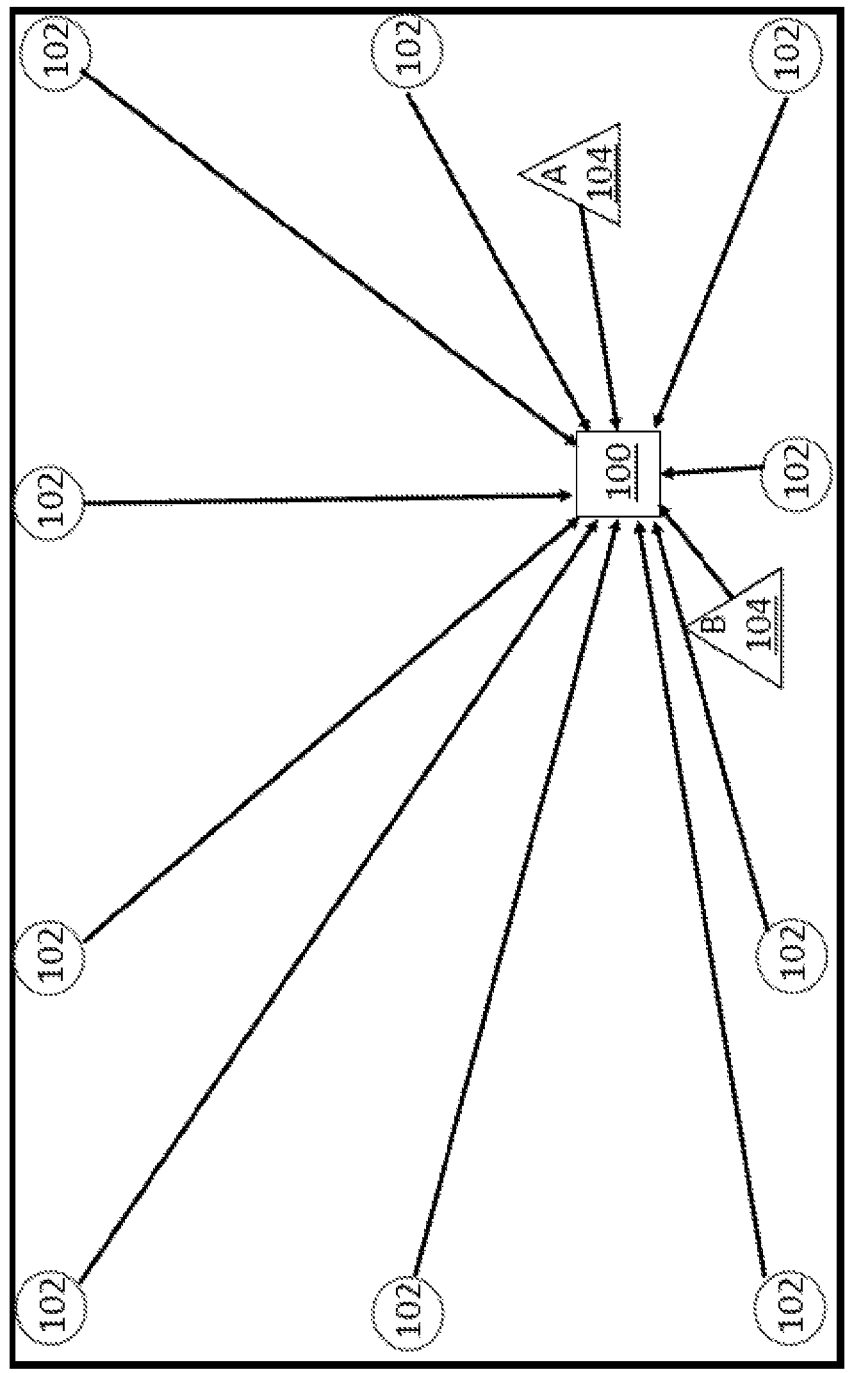
FIG. 4 illustrates an exemplary schematic representation of the tracking and analysis package in use in an environment with both fixed and moveable tracking beacons.

With reference now to FIG. 4, the low frequency Bluetooth signals (shown as arrows in FIG. 4) sent out by both the fixed tracking beacons 102 (shown as circles in FIG. 4), and the moveable 104 tracking beacons (shown as triangles in FIG. 4), are received by an exemplary tracking and analysis device 100 on a mobile cart or workflow asset (represented by square box in FIG. 4). The strength of the signal (shown as arrows in FIG. 4) received by the tracking and analysis device 100 on the cart (square), helps to determine the cart's distance from each of the fixed 102 and movable 104 tracking beacons. A strong signal received by tracking and analysis device 100 on a cart would indicate it is closer to a particular beacon, while a weak signal received by a cart would indicate it is further away from a particular beacon. In this manner, the tracking and analysis device 100 on the cart is able to use the low frequency Bluetooth signals (shown as arrows) to pinpoint its own location within a few feet, such as within a range of 2 or 3 feet for example. This ability to pinpoint a location within about 2 or 3 feet is a great improvement over existing technology, which could previously only determine location within a range of about 30 feet. In the past, multi-level or high-rise buildings would not have been able to pinpoint on which floor or level as asset was located if the asset's location if it was only determined with a range of about 20-30 feet. Now, workflow assets on multi-level buildings can be located within only 2-3 feet, which can be extremely helpful in a major metropolitan hospital workflow environment, for example.

As shown in FIG. 4, the tracking and analysis device 100 on the cart (shown as a square in FIG. 4) would receive signals (shown as arrows) from both of the exemplary moveable tracking beacons 104 (shown as triangles). The tracking and analysis device 100 on the cart would receive stronger signals (shown as arrows) from the movable tracking beacon "A" 104 (shown as a triangle), than from movable tracking beacon "B" 104 (shown as a triangle), thus providing the cart with the information that movable tracking beacon "A" 104 is closer. For example, this data (as shown in FIG. 4) may show that there are too many assets (i.e., two moveable tracking beacons "A" and "B" 104, as well as the cart with the tracking and analysis device 100) all within very close proximity to each other and thus, at least one asset may need to be deployed to another area to optimize workflow operations and improve overall workflow efficiency.

In addition to determining which moveable tracking beacon 104 (which may represent an asset in a workflow operation) is closer, the tracking and analysis device 100 may further relay this data back to a central control processor or administrator for further analysis. In one embodiment, he data and information collected by the tracking and analysis device may then be replayed to an administrator, such as at a control center or panel, for further analysis. In this way, the data may then be used to help create better workflow pathing, better utilization of workflow assets, and/or even determine if there are too many or too few workflow assets available, to optimize overall workflow efficiency.

Additionally, because the tracking and analysis device 100 contains an accelerometer 120, it can further determine if the cart (containing the tracking and analysis device 100 and/or a movable tracking beacon 102) is moving, in which direction it is moving, and at what speed. The accelerometer 120 may also help geolocate items and act as a digital v. real compass. In this way, if several tracking and analysis devices 100 (on several different carts) are all moving toward the same place at the same time (such as during a hospital emergency, for example), some may be redirected in real time to optimize workflow operations.

The RFID reader/scanner 116 may further provide information on items nearby containing RFID tags. For example, the RFID reader/scanner 116 on the tracking and analysis device 100 placed on a medical cart within a hospital may help provide data on which medical items need to be restocked. This information can help to optimize workflow operations within a hospital, for example, by significantly reducing time spent by employees running and back and forth to a stockroom or storage area to replenish items.

In yet another embodiment, the low frequency Bluetooth module 118 may be used to detect signals from people's cell phones to optimize employee workflow operations, improve retail sales operations, etc. The low frequency Bluetooth module 118 will not only be able to recognize how many customers or employees (having cell phones or other devices sending low frequency Bluetooth signals) walk near the tracking and analysis device 100, but could also determine how long they stand there, thus revealing data on how interested consumers are in specific products and/or how long, and how many, employees remain near the device 100. In another embodiment, the low frequency Bluetooth module 118 could be used in combination with many other fixed 102 and movable 104 tracking beacons (also having low frequency Bluetooth modules 118) placed all around a retail store. In this embodiment, the tracking and analysis device 100 could more precisely locate people (having a cell phone with the store's app) within the store and in relation to the tracking and analysis device's 100 location. In some cases, the low frequency Bluetooth module 118 within the tracking and analysis device 100 may be able to pinpoint a cell phone's (or person's) location with approximately 2 feet. The low frequency Bluetooth module 118 may also then log or note if the person remained near a particular tracking and analysis device 100 for more than 30 seconds, and/or measure how long a person stayed there before moving on.

While various embodiments of devices and systems and methods for using the same have been described in considerable detail herein, the embodiments are merely offered as non-limiting examples of the disclosure described herein. It will therefore be understood that various changes and modifications may be made, and equivalents may be substituted for elements thereof, without departing from the scope of the present disclosure. The present disclosure is not intended to be exhaustive or limiting with respect to the content thereof.

Further, in describing representative embodiments, the present disclosure may have presented a method and/or a process as a particular sequence of steps. However, to the extent that the method or process does not rely on the particular order of steps set forth therein, the method or process should not be limited to the particular sequence of steps described, as other sequences of steps may be possible. Therefore, the particular order of the steps disclosed herein should not be construed as limitations of the present disclosure. In addition, disclosure directed to a method and/or process should not be limited to the performance of their steps in the order written. Such sequences may be varied and still remain within the scope of the present disclosure.

The invention claimed is:

1. A system for optimizing workflow operations by tracking a workflow asset, comprising:

at least two movable tracking beacons, each moveable tracking beacon attached to a separate mobile workflow asset, each moveable tracking beacon comprising:
- a Bluetooth module configured to communicate with other Bluetooth devices within range;
- an accelerometer for measuring movement and acceleration of the attached workflow asset; and
- a battery for charging the Bluetooth module and the accelerometer; and three or more fixed tracking beacons configured for placement around a workflow environment, each of the three or more fixed tracking beacons having at least a beacon battery and a beacon Bluetooth module therein, and configured to repeatedly send out Bluetooth signals;

wherein the three or more fixed tracking beacons are placed close enough together to ensure full Bluetooth signal coverage of the workflow environment and prevent any gaps that are not able to receive a signal such that a tracking and analysis device can receive a Bluetooth signal sent from any of the three or more fixed tracking beacons regardless of location within the workflow environment to determine the location of itself; and the tracking and analysis device in Bluetooth communication with the at least two movable tracking beacons and configured to determine a location of the at least two movable tracking beacons and the attached mobile workflow assets present within the workflow environment by analyzing signal strength(s) of the Bluetooth signals received from the at least two moveable tracking beacons;

wherein the tracking and analysis device comprises a tracking beacon therein;

wherein the tracking and analysis device is configured to determine based on the Bluetooth signals received by the tracking and analysis device from the at least two moveable tracking beacons, that at least one asset should be deployed to another area; and wherein the data from the tracking and analysis device is relayed back to a central control administrator or processor to redirect one of the mobile workflow assets to another area of the workflow environment in real time to optimize workflow operations.

2. The system of claim 1, wherein the tracking and analysis device further comprises a Wi-Fi module configured to communicate with other Wi-Fi enabled devices.

3. The system of claim 1, wherein the tracking and analysis device further comprises a RFID reader/scanner configured to detect and read RFID tags.

4. The system of claim 1, wherein the tracking and analysis device is a plurality of tracking analysis devices, and wherein the system is configured to track and monitor the plurality of tracking and analysis devices within the workflow environment simultaneously.

5. The system of claim 1, wherein the tracking and analysis device is further configured to transmit data to the central control administrator or processor for additional analysis and to provide real-time workflow optimization data.

6. The system of claim 1, wherein the tracking and analysis device is rechargeable.

7. The system of claim 1, wherein the at least two movable tracking beacons are replaceable.

8. The system of claim 1, wherein the three or more fixed tracking beacons are placed around the workflow environment in a grid configuration at intervals of no more than 20 feet apart.

9. The system of claim 1, further comprising a 5-volt USB hub for charging the tracking and analysis device.

10. The system of claim 1, wherein the tracking and analysis device further increases workflow efficiency by using the Bluetooth module of the at least two movable tracking beacons to track the number of customers or employees with a cell phone within the range of the at least two moveable tracking beacons, as well as how long those customers or employees remain near the tracking and analysis device.

11. The system of claim 1, further comprising software for use in analyzing data received from the tracking and analysis device.

12. The system of claim 1, wherein one of the at least two movable tracking beacons are combined with, or incorporated into, the tracking and analysis device.

13. The system of claim 1, wherein the tracking and analysis device determines the location of the at least two movable tracking beacons within a range of 2-3 feet.

14. A method for tracking a workflow asset, comprising:
providing a moveable tracking beacon, comprising:
- a Bluetooth module configured to communicate with other Bluetooth devices within range;
- an accelerometer for measuring the movement and acceleration of an attached first workflow asset; and
- a battery for charging the Bluetooth module and the accelerometer; and attaching the movable tracking beacon to the first workflow asset to be tracked;

providing a tracking and analysis device comprising:
- a second Bluetooth module configured to communicate with other Bluetooth devices within range;
- a second accelerometer for measuring the movement and acceleration of an attached second workflow asset; and
- a second battery for charging the second Bluetooth module and the second accelerometer; and attaching the tracking and analysis device to a second workflow asset;

positioning three or more fixed tracking beacons around a workflow environment close enough together to ensure full Bluetooth signal coverage of the workflow environment and prevent any gaps that are not able to receive a signal such that the tracking and analysis device can detect a Bluetooth signal sent from any of the three or more fixed tracking beacons regardless of location within the workflow environment;

activating the three or more fixed tracking beacons to emit a plurality of Bluetooth signals therefrom;

receiving the plurality of Bluetooth signals at the tracking and analysis device to determine the position of the second workflow asset within the workflow environment;

receiving a Bluetooth signal from the moveable tracking beacon at the tracking and analysis device, wherein the relative signal strength of the Bluetooth signal received from the moveable tracking beacon indicates the distance between the first workflow asset and the second workflow asset;

redirecting either the first workflow asset or the second workflow asset to another area of the workflow environment to optimize workflow operations; and relaying the data from the tracking and analysis device back to a central control administrator or processor.

15. The method of claim 14, wherein the distance of the three or more fixed tracking beacons relative to the tracking and analysis device is pinpointed to within a range of at least 2-3 feet.

16. The method of claim 14, wherein the three or more fixed tracking beacons are placed around the workflow environment in a grid pattern at intervals of no more than 20 feet.

17. The method of claim 14, wherein the plurality of Bluetooth signals received by the tracking and analysis device further indicate a direction and speed at which the tracking and analysis device is moving.

18. A first and a second tracking and analysis device for tracking a first and a second mobile workflow asset, respectively, within a workflow environment, each tracking and analysis device comprising:
   a movable tracking beacon attached to the workflow asset, comprising;
      a Bluetooth module configured to communicate with other Bluetooth devices within range;
      an accelerometer for measuring the movement and acceleration of the workflow asset; and
      a battery for charging the Bluetooth module and the accelerometer; and
   each movable tracking beacon located within the respective tracking and analysis device, wherein the movable tracking beacons within the tracking and analysis devices calculate their location and the location of the workflow asset attached thereto within a workflow environment by analyzing relative signal strength of Bluetooth signals received from at least three or more fixed tracking beacons;
   wherein the at least three or more fixed tracking beacons are placed close enough together to ensure full Bluetooth signal coverage of the workflow environment and prevent any gaps that are not able to receive a signal such that the tracking and analysis devices can detect a Bluetooth signal sent from any of the three or more fixed tracking beacons regardless of location within the workflow environment;
   wherein based on signals received by the first and second tracking and analysis devices from their respective accelerometers, the first and the second tracking and analysis devices can determine what direction and what speed the first and the second mobile workflow assets are moving and determine that the first workflow asset and the second workflow asset are moving toward the same place at the same time; and
   wherein the data from the first and the second tracking and analysis devices are relayed back to a central control administrator or processor to redirect either the first mobile workflow asset or the second mobile workflow asset to another area of the workflow environment in real time to optimize workflow operations.

19. The device of claim 18, wherein each of the tracking and analysis devices further determines the location of itself, and the workflow assets attached thereto, within a range of 2-3 feet.

20. The device of claim 18, wherein the tracking and analysis devices further indicate a direction and speed at which the workflow assets are is moving.

* * * * *